United States Patent [19]

Hill et al.

[11] 4,171,907

[45] Oct. 23, 1979

[54] ELECTRO-OPTIC DISTANCE MEASURING DEVICE

[75] Inventors: Douglas G. Hill, Solana Beach; Richard N. Jekel, La Mesa; William W. Busche, San Diego; James E. Stufflebeam, San Diego; Robert L. Bruce, San Diego, all of Calif.

[73] Assignee: Cubic Western Data, San Diego, Calif.

[21] Appl. No.: 909,373

[22] Filed: May 25, 1978

[51] Int. Cl.$^2$ .................... G01C 3/08; G01B 11/26
[52] U.S. Cl. .......................... 356/5; 33/284; 356/141; 356/148
[58] Field of Search ............... 356/5, 152, 141, 148; 33/284, 283; 343/12

[56] References Cited

U.S. PATENT DOCUMENTS

| | | | |
|---|---|---|---|
| 3,111,665 | 11/1953 | Werner et al. | 343/12 R |
| 3,778,159 | 12/1973 | Hines et al. | 356/5 |
| 3,832,056 | 8/1974 | Shipp et al. | 343/12 R |
| 3,848,999 | 11/1974 | Dall'Armi | 356/5 |
| 3,874,087 | 4/1975 | Nunlist | 33/284 |
| 4,113,381 | 9/1978 | Epstein | 356/5 |

OTHER PUBLICATIONS

Bullock et al., Hewlett-Packard Journal, vol. 27, No. 8, pp. 2-12. Apr. 1976.
Aga Geodimeter 700 Operating Manuel, Aga Geotronics AB, S-18181 Lidingo, Sweden.

*Primary Examiner*—S. C. Buczinski
*Attorney, Agent, or Firm*—Brown & Martin

[57] ABSTRACT

A device for measuring distances to a target includes electronic circuits for generating a light which is amplitude modulated by three selectable frequencies. Also included are optics for focusing the amplitude modulated light onto the target, and for receiving reflection of the light therefrom. Additional circuits convert the received light to electrical signals representative thereof, and compute the phase angles between these signals and the amplitude modulating signals. The distance to the target is then calculated based on these phase angles and the wavelength of frequencies equal to the differences between the three selectable frequencies. Another circuit uses an accelerometer to measure vertical angle to the target, and further distance measurements are made based thereon. Still other circuits compensate for a variety of potential error causing conditions, such as signal waveform asymmetry and component tolerance. A subassembly of the device is mountable on a theodolite telescope and utilizes folded optics in order to be plungeable.

14 Claims, 15 Drawing Figures

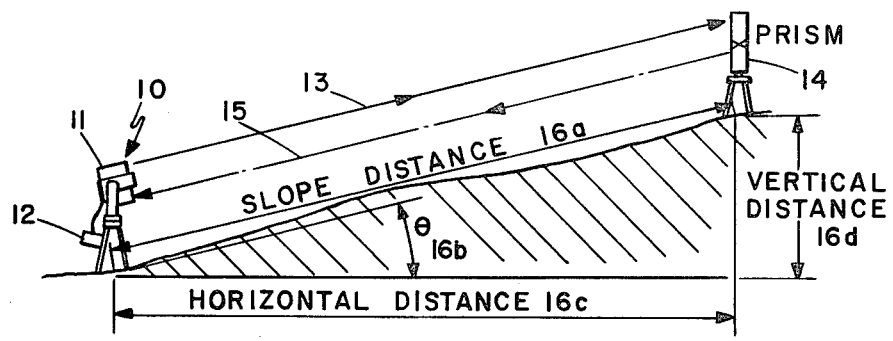
Fig. 1
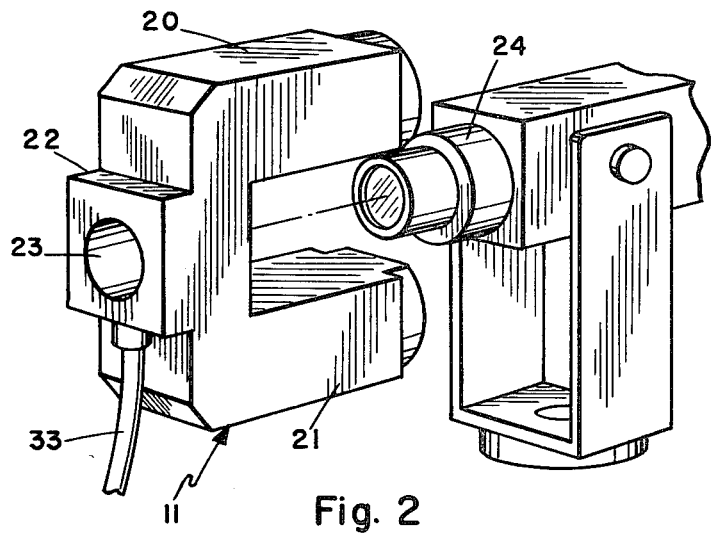
Fig. 2
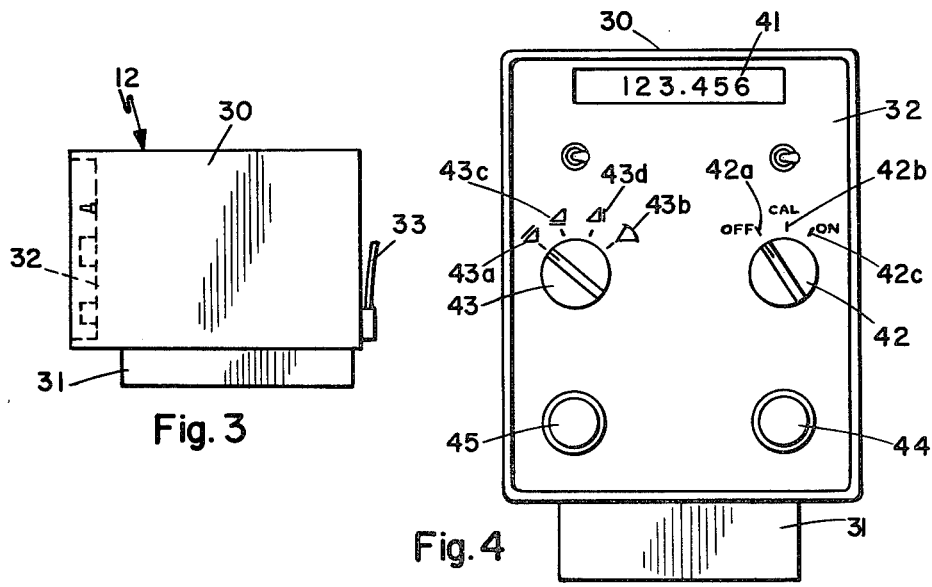
Fig. 3
Fig. 4

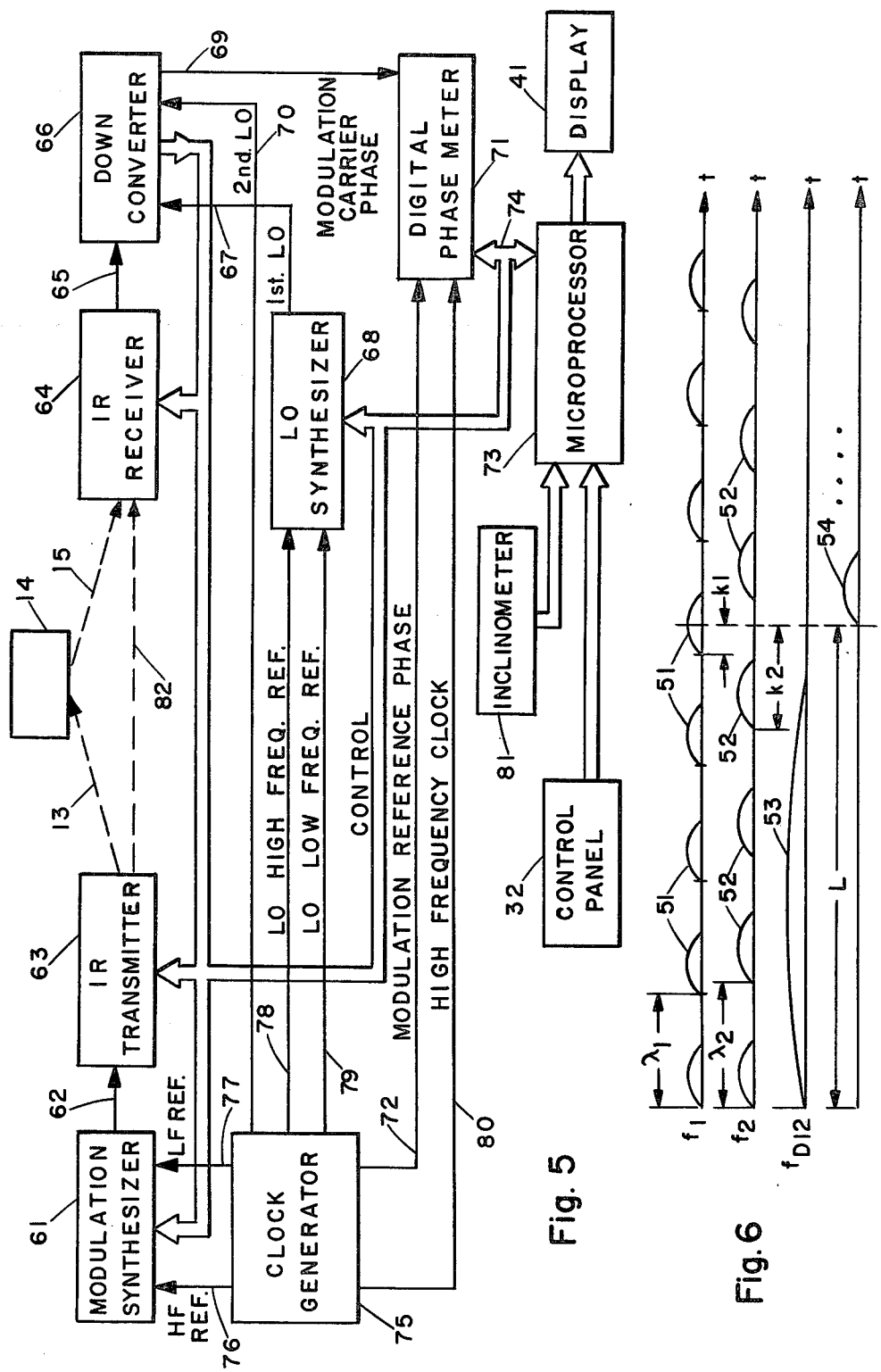

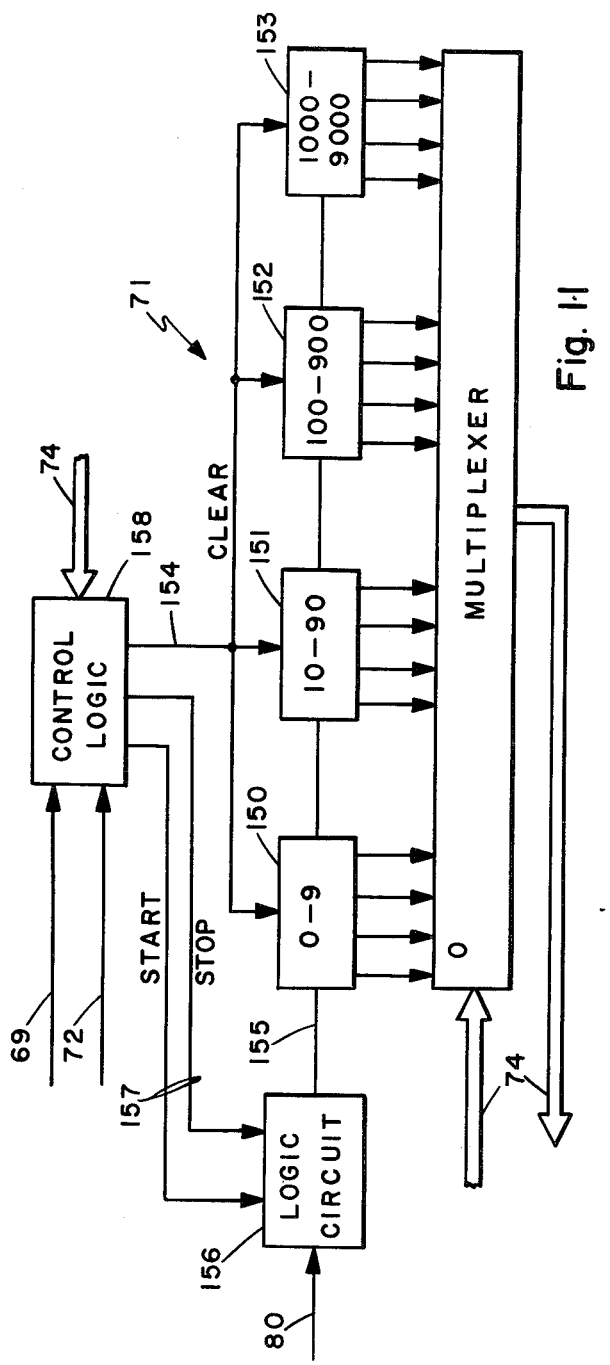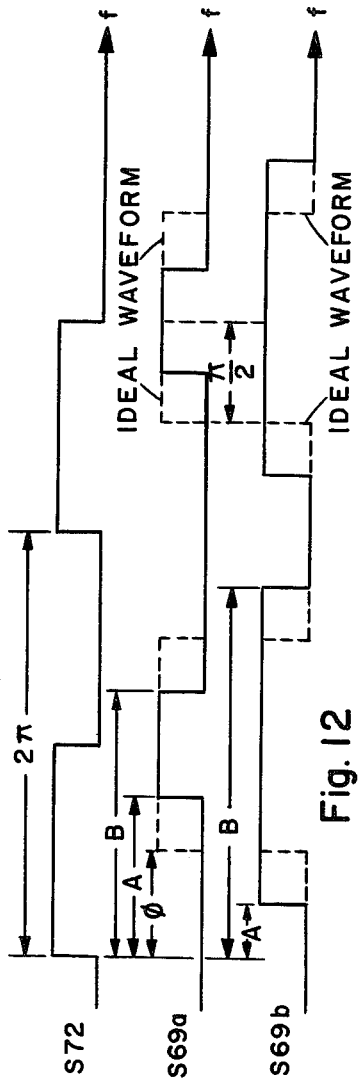
Fig. 11
Fig. 12

ELECTRO-OPTIC DISTANCE MEASURING DEVICE

BACKGROUND OF THE INVENTION

The disclosed invention relates to distance measuring devices, and more particularly to devices which automatically measure distance by transmitting light beams to a target and making calculations based on reflections of the light beam from the target. One prior art device which makes such measurements, operates by transmitting a plurality of light pulses which are spaced apart in time by an interval which is larger than the time required for a single pulse to be transmitted to the target and reflected back to the device. These are known as time measurement devices, as opposed to phase measurement devices. In operation, a timing counter is started upon the transmission of the light pulse, and is stopped upon receipt of the corresponding relfected light pulse. A problem with this type device however, is that their operation is relatively slow. This is because the occurrence in time of the leading edge of the received pulse is difficult to determine with a single measurement. Accordingly, a large number of pulses, typically several hundred pulses, must be transmitted and received; and the time delay for each of these pulses is averaged to determine with suitable statistical confidence, the distance between the device and the target.

Other prior art devices operate on phase measurement principles. These devices transmit a light beam which is amplitude modulated by a particular frequency, and simultaneously receive reflections of the light beam from the target. In these devices, distance measurements are made based on the phase angle between the transmitted light beam and the reflected light beam. A problem with these devices however, is that in order for there to be no ambiguities in the phase angle, the modulating frequency must be low—such that the corresponding wavelength is greater than the distance to be measured. Typically, distances of 2,000 meters are to be measured; and thus the modulating frequency must typically be in the order of 75 KHz. Typically, the phase angle is determined by enabling a counter a count clock pulses of a fixed frequency at the zero degrees point on the transmitted light beam and by stopping the counter at the zero degrees point on the recieved light beam. Each count of the counter then represents a portion of the wavelength of the modulating frequency. However, since the wavelength must necessarily be larger than the distance that is measured, the size of the counter must also be large. And typically, to have each count of the counter represent a small increment of distance, such as a millimeter, would make the counter prohibitively large.

In order to overcome this resolution problem, more modern distance measuring devices which operate on phase measurement principles, typically transmit three frequencies. One of these frequencies has a wavelength larger than the total distance to be measured; while the second and third frequencies have wavelength which are fractions of the first frequency. In operation, phase measurements were made at each of the three frequencies. Then the low frequency is utilized to approximate the distance to the target, while the high frequencies are utilized to improve the resolution. A problem with these devices however, is that in order to generate short, medium and long wavelengths, the frequency spread of the light modulating signal is very large. For example, the frequencies typically ranged from 75 KHz to 30 MHz if the total distance was 2,000 meters and the resolution was 1 millimeter. Thus, these devices required sophisticated frequency generating circuitry that could modulate a light beam over such a widely varying range.

Also in the prior art, some devices automatically calculate the horizontal and vertical distances between the device and the target. These calculations depend upon the determination of the vertical angle formed by the target, the device, and the horizontal axis. In the prior art, this angle is determined by electro-mechanical angle sensing devices having resolution which is less than desired. Further, some of these devices are inoperable over the full vertical angle range of 0 to 90 degrees. Also, many of the devices have offset errors, are sensitive to temperature changes, to gravitation changes, and to component tolerances.

A variety of other problems also existed in the prior art devices. For example, after the reflected waveform is received in the device, and is converted to an electrical signal, the signal typically undergoes some processing before actual phase measurements are made thereon. For example, the signal may be mixed with other frequencies to obtain a frequency shift. This processing typically stretches or shrinks the signal, and this distortion introduces errors into the phase measurements.

Also, in order for the distance measuring device to measure both short distances and long distances, it must be capable of generating electrical signals representative of a reflected light beam which varies substantially in intensity. For example, the intensity of a light beam reflected from a close target may be as much as 80 dB times stronger than the intensity of a light beam reflected from a distant target. Accordingly, circuitry must be included in the device to compensate for this varying signal strength. In the past, this compensation was performed exclusively by electronic circuits, and these are both expensive and complex.

Accordingly, it is one object of the invention to provide an improved distance measuring device.

Another object of the invention is to provide a distance measuring device which transmits only high frequency signals.

Another object of the invention is to provide a distance measuring device having an improved vertical angle sensor.

Another object of the invention is to provide a distance measuring device having in field calibration that compensates for substantially all offset errors.

Another object of the invention is to provide a distance measuring device which compensates for phase errors introduced by signal processing distortion.

Still another object of the invention is to provide a distance measuring device which mechanically compensates for intensity variation in the reflected light.

SUMMARY OF THE INVENTION

These and other objects are accomplished in accordance with the invention by a device which includes a first electronic circuit for generating electrical modulation signals of selectable frequencies and for generating a light beam which is amplitude modulated by the modulating signals. An optical assembly transmits the amplitude modulated light beam to a target and receives reflections of the transmitted light beam therefrom. A second electronic circuit converts the reflections to electrical signals representative thereof. A third electronic circuit computes the phase angle between the modulating signals and the signals representative of the reflections. A fourth electronic circuit computes the distance L traveled by the light beam based on the relationship $L=\lambda_{D12}(\theta 1-\theta 2)$ when $(\theta 1-\theta 2)$ is positive, and $L=\lambda_{D12}(1+\theta 1-\theta 2)$ when $(\theta 1-\theta 2)$ is negative. In this expression, $\theta 1$ is the phase angle when the light beam is amplitude modulated by a first selectable frequency, and $\theta 2$ is the phase angle when the light beam is amplitude modulated by a second selectable frequency. The symbol $\lambda_{D12}$ is the wavelength of a light beam which is amplitude modulated by the difference between the first and second selectable frequencies. To improve resolution, the light beam is also amplitude modulated by a third selectable frequency. The most significant digits of distance L are then computed by utilizing the above relationships while the remaining digits are calculated by utilizing the relationships $L=\lambda_{D23}(\theta 2-\theta 3)$, $L=\lambda_{D23}(1+\theta 2-\theta 3)$, and $L=\lambda_2\theta 2$. In these expressions, $\theta 1$, $\theta 2$, and $\theta 3$ are expressed in fractions of a cycle.

The disclosed device further includes an accelerometer which is used in conjunction with a dual slope integrating voltmeter to measure vertical angle to the target. The device is operable over the range of 0 to 90 degrees, and has a resolution on the order of micro g's. Also included are circuits which compensate for offset errors which may be present in the accelerometer due to component tolerances, temperature variations, gravity variations, and the like.

In part, the compensation is accomplished by providing means for mounting the device on a theodolite telescope. Reference angles can be read therefrom and used to calibrate the accelerometer. Also, while mounted on the telescope, the device is plungeable. That is, it enables the surveyor to observe both the "station angle" and the "explement angle" as determined by a national survey standard known as the "Traverse Method".

The optics within the device have a unique folded arrangement which shortens the device's physical length while at the same time permitting a long focal length. This enables the device to be plungeable. The optics also include an iris type shutter, which compensates for variation in the intensity of the reflected light beam.

BRIEF DESCRIPTION OF THE DRAWINGS

The invention itself is set forth in the appended claims. Various preferred embodiments of the invention however, as well as other features and advantages thereof, will best be understood by reference to the following detailed description when read in conjunction with the accompanying drawings wherein:

FIG. 1 is a pictorial view of the disclosed device in an operating environment.

FIG. 2 is an enlarged pictorial view of one subassembly comprising the device of FIG. 1.

FIG. 3 is an enlarged view of a second subassembly comprising the device of FIG. 1.

FIG. 4 illustrates a control panel comprising a portion of the subassembly of FIG. 3.

FIG. 5 is a block diagram of the electronics within the disclosed device.

FIG. 6 is a set of curves illustrating the principles of operation of the disclosed device.

FIG. 11 is a detailed circuit diagram of block 71 in FIG. 5.

FIG. 12 is a set of curves illustrating the operation of the circuit of FIG. 11.

DETAILED DESCRIPTION OF THE DRAWINGS

Figure 7:
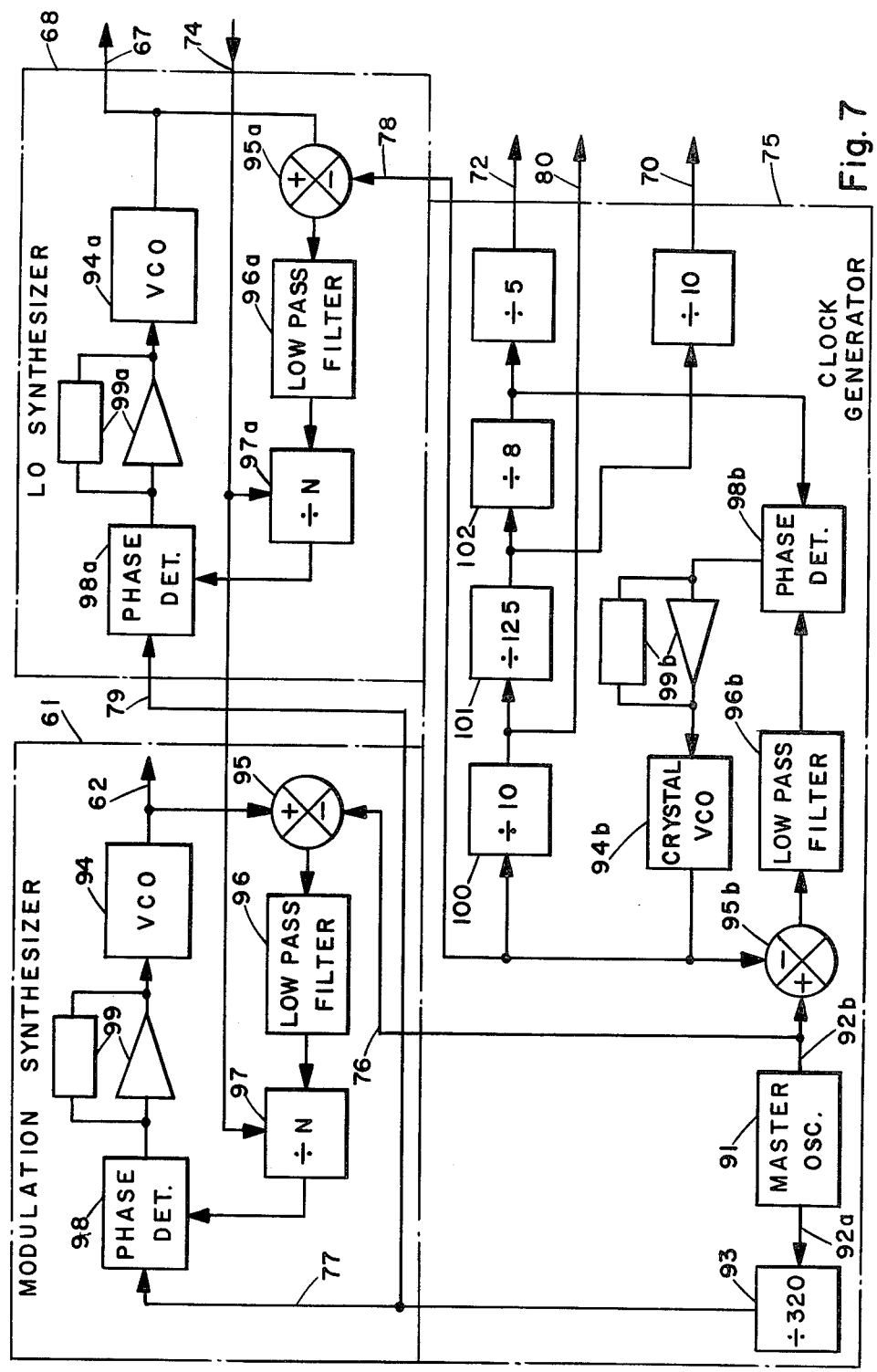
FIG. 7 is a detailed circuit diagram of blocks 61, 68, and 75 in FIG. 5.

Referring now to FIG. 1, there is illustrated a pictorial view of the disclosed distance measuring device 10 in an operating environment. Basically, device 10 includes a theodolite mounted subassembly 11, and a tripod mounted subassembly 12. Subassembly 11 includes electronics for generating a light beam 13 which is amplitude modulated by selectable modulating frequencies, optics for focusing light beam 13 onto a target 14, optics for receiving and focusing reflections 15 of light beam 13 from target 14, and electronics for converting the focused reflection to electrical signals representative thereof. Subassembly 12 includes electronics for selecting the modulating frequency of the transmitted light beam 13, for determining the phase angle between the modulating signals and the signals representative of the received reflections 15, and for computing slope distance 16 based on the relationships $L=\lambda_{D12}(\theta 1-\theta 2)$ when $(\theta 1-\theta 2)$ is positive, and $L=\lambda_{D12}(1+\theta 1-\theta 2)$ when $(\theta 1-\theta 2)$ is negative.

In these expressions, $\theta 1$ is the phase angle between the transmitted light beam 13 and the received reflections 15 when light beam 13 is amplitude modulated by a first selectable frequency; and $\theta 2$ is the phase angle between the transmitted amplitude modulated light beam 13 and the received reflections 15 when light beam 13 is modulated by a second selectable frequency. Also in these equations, the quantity $\lambda_{D12}$ is the wavelength of a hypothetical light beam which is amplitude modulated at a frequency equal to the difference between the first and second selectable frequencies. This hypothetical light beam is not actually transmitted, and is merely a number. Preferably, the first and second selectable frequencies are in the megahertz range, while the difference between them is in the kilohertz range. Accordingly, $\lambda_{D12}$ is on the order of several thousand meters; and thus slope distances 16a of that magnitude can be measured by utilizing modulating frequencies in the megahertz range.

Preferably, light beam 13 is also amplitude modulated by a third selectable frequency. The third selectable frequency is chosen to be approximately the geometric means of the first and second selectable frequencies. In other words, the third selectable frequency is chosen such that the hypothetical wavelength $\lambda_{D23}$ lies approximately midway in ratio between $\lambda_{D12}$ and $\lambda_2$. Subassembly 12 utilizes the phase angles corresponding to the first, second and third selectable frequencies to calculate slope distance 16a with improved resolution. Details of the electronics which perform these calculations are described herein in conjunction with FIG. 6.

Also included within subassembly 12 is an inclinometer which measures an angle 16b between slope distance 16a and the horizontal axis. This inclinometer is described in greater detail in conjunction with FIG. 15. Based on angle 16b and slope distance 16a, the electronics within subassembly 12 calculates horizontal distance 16c and vertical distance 16d to reflector 14.

Additional details of the mechanical packaging of subassembly 11 will now be described in conjunction with FIG. 2. As therein illustrated, subassembly 11 is U-shaped, and includes a transmit aiming head 20 and a receiving head 21. Heads 20 and 21 are connected together by a theodolite mount 22. A hole 23, having the shape of the axial cross-section of the theodolite telescope 24 is provided by mount 22. In operation, the theodolite telescope 24 snugly fits through hole 23 to thereby become rigidly attached to subassembly 11.

One feature of the above described subassembly 11 is that it is plungeable. That is, the theodolite telescope 24 with subassembly 11 mounted thereon, may be rotated 180° in the vertical plane. This rotating or plunging places head 20 beneath head 21 in one position, and places head 20 above head 21 in the other position. This rotating or plunging is commonly required to be performed by surveyors. In part, this plungeability is achieved by constructing heads 20 and 21 with a relatively short length. At the same time however, the optics within heads 20 and 21 must have a long focal length to appropriately transmit and receive light beams 13 and 15. These conflicting requirements are met by a unique folded optics design which will be described in detail in conjunction with FIG. 13.

Another feature of the above described design is that it enables the inclinometer within subassembly 12 to be calibrated while in operation in the field. During calibration, the theodolite telescope provides reference point angles which are correlated with signals from the inclinometer. Specifically, the electonics within subassembly 12 senses these reference point settings, and simultaneously senses the corresponding output from the inclinometer. Based on these sensings, the electronics within subassembly 12 establishes a true zero horizontal reference point. In this manner, any error signals from the inclinometer which could be due to inaccurate factory settings, temperature changes, gravity variations, or other such common occurrences are offset. Additional details of this feature are described in conjunction with FIGS. 4 and 15.

Further details of subassembly 12 are illustrated in FIG. 3. Subassembly 12 basically includes a data processor 30, and a battery pack 31. Processor 30 and battery 31 are portable in size, and preferably are attached to the tripod which holds the theodolite telescope. Specifically, processor 30 is approximately 9½ inches by 6 inches by 4½ inches, and weighs approximately 5 pounds. Battery 31 is a rechargeable six volt sealed gel cell and provides approximately 2½ hours of continuous operation for processor 30.

Subassembly 12 also includes a control and indicator panel 32. Panel 32 provides a means for manually controlling the operations which device 10 performs, and for indicating the measured distances and angles. A cable 33 provides a means for interconnecting the electronics within subassemblies 11 and 12. Cable 33 is fixedly mounted to subassembly 11 and plugs into subassembly 12.

As illustrated in FIG. 4, panel 32 includes a digital display 41 for readout of the measured quantities 16a–16d. Panel 32 also includes a multiposition switch 42. Position 42a is an off position; position 42b is a calibrate position; and position 42c is a normal operating position. Also included is another multi-position switch 43 which operates in conjunction with switch 42. Specifically, when switch 42 is in position 42c, the unknown quantities 16a–16d are measured by placing switch 43 into positions 43a–43d respectively. The measured value is calculated and subsequently displayed via display 41, in response to the depression of a pushbutton switch 44. Similarly, switches 42 and 43 operate in conjunction with each other to enable calibration of the above described inclinometer. Specifically, this calibration occurs in response to setting switch 42 in position 42b, setting switch 43 in position 43b, and depressing pushbutton switch 45.

Referring now to FIGS. 5 and 6, a block diagram of the electronics within the disclosed device, and the principals upon which these electronics operates will be described. FIG. 5 is a block diagram of the electronics; while FIG. 6 is a set of signal waveforms which illustrate their principle of operation. Included within FIG. 6 are waveforms 51–54. Waveform 51 represents the transmitted light beam 13 when it is amplitude modulated by a signal of frequency f1; and waveform 52 represents the transmitted light beam 13 when it is amplitude modulated by a frequency f2. The wavelength of frequencies f1 and f2 are also illustrated in FIG. 6 as $\lambda_1$ and $\lambda_2$ respectively. Preferably, frequency f1 is only slightly greater than frequency f2; and thus $\lambda_1$ is slightly less than $\lambda_2$.

Waveform 53 illustrates a hypothetical light beam when it is amplitude modulated by a freqency $f_{D12}$ which equals f1−f2. Since frequencies f1 and f2 are relatively close to each other, frequency $f_{D12}$ is relatively small. Accordingly, it has a wavelength $\lambda_{D12}$ which is substantially greater than wavelengths $\lambda_1$ and $\lambda_2$. The disclosed device calculates slope distance 16a based on the wavelength $\lambda_{D12}$ and the phase angle between transmitted waveform 51 and 52 and the received waveform 54. These phase angles are indicated in FIG. 6 by the symbols k1 and k2. For convenience of illustration, only the first pulse of the reflected light beam is illustrated. However, it is to be understood that the number of transmitted pulses equals the number of received pulses and these subsequently received pulses are indicated by the dots which follow waveform 54.

Clearly, slope distance 16a equals ½ the distance L which is traveled by the transmitted waveform and received waveform. And this distance L is given by the following equations:

$$L = \lambda_{D12}\left(\frac{k_1}{\lambda_1} - \frac{k_2}{\lambda_2}\right) \text{ when } \frac{k_1}{\lambda_1} > \frac{k_2}{\lambda_2}$$

$$L = \lambda_{D12}\left(1 + \frac{k_1}{\lambda_1} - \frac{k_2}{\lambda_2}\right) \text{ when } \frac{k_1}{\lambda_1} < \frac{k_2}{\lambda_2}$$

The above equations are derived as follows. By definition, $f1 - f2 = f_{D12}$. Also by definition, $\lambda = c/f$, where c is the speed of light. Thus by substitution, $$\frac{c}{\lambda_1} - \frac{c}{\lambda_2} = \frac{c}{\lambda_{D12}}.$$

This equation is divided by c and multiplied by L to yield:

$$\frac{L}{\lambda_{D12}} = \frac{L}{\lambda_1} - \frac{L}{\lambda_2}.$$

In this equation the terms $L/\lambda_1$ and $L/\lambda_2$ are much greater than 1. Accordingly, the term $L/\lambda_1$ can be rewritten as $n_1+(k_1/\lambda_1)$; and the term $1/\lambda_2$ can be rewritten as $n_2+(k_2/\lambda_2)$. In these expressions, the terms $n_1$ and $n_2$ are integers, and the quantities $k_1$, $\lambda_1$, $k_2$, $\lambda_2$ are as indicated in FIG. 6.

Thus by substitution, one gets the equation:

$$\frac{L}{\lambda_{D12}} = \left(n_1 + \frac{k_1}{\lambda_1}\right) - \left(n_2 + \frac{k_2}{\lambda_2}\right)$$

In this equation, the term $L/\lambda_{D12}$ lies between zero and one. That is the wavelength of the difference frequency $f_{D12}$ is made to be greater than the distance L which is to be measured. Thus in order for the term $L/\lambda_{D12}$ to be between zero and one, $n_1$ must equal $n_2$ when $k_1/\lambda_1$ is greater than $k_2/\lambda_2$; and $n_1 + 1$ must equal $n_2$ when $k_1/\lambda_1$ is less than $k_2/\lambda_2$. Accordingly, by algebraic manipulation, the above given expressions for L in terms of $\lambda_{D12}$, $k_1$, $\lambda_1$, $k_2$, and $\lambda_2$ are derived.

The disclosed device extends these principles by modulating light beam 13 at three different frequencies. Specifically, light beam 13 is modulated by a frequency f1 equal to 30.054,198 MHz; a frequency f2 equal to 29.979,250 MHz; and a frequency f3 equal to 28.480,278 MHz. The difference frequency f1−f2 equals 75 KHz and has a corresponding wavelength $\lambda_{D12}$ equal to 4000 meters. Similarly, the difference frequency f2−f3 equals 1.5 MHz and has a corresponding wavelength $\lambda_{D23}$ equal to 200 meters. Frequency f2 by itself has a wavelength $\lambda_2$ equal to 10 meters. In operation, the difference frequency of 75 KHz is utilized to compute only the thousands and hundreds digits of distance L. Similarly, the difference frequency of 1.5 MHz is utilized to compute the hundreds, tens and units digits of distance L; and the frequency of 29.9 MHz is utilized to compute the units, tenths, hundredths, and thousandths digits of distance L. By utilizing this technique, distance L is computed with greater resolution than if only the 75 KHz frequency were used.

In order to generate frequencies f1, f2 and f3, the electronics within the disclosed device includes a modulation synthesizer 61 as illustrated in FIG. 5. Synthesizer 61 has an output lead 62 on which signals of the modulating frequencies f1-f3 are generated. Lead 62 couples to the input of an infrared light transmitter. The output of transmitter 63 is light beam 13 which is amplitude modulated at the frequency of the signals on lead 62. The reflected amplitude modulated light beam 15 is received by an infrared receiver 64. Receiver 64 has an output lead 65 on which are generated electrical signals representative of the received light beam 15.

Lead 65 couples to the input of a down converter 66. Converter 66 frequency shifts the signals on lead 65 to a first IF frequency of 2.398 KHz. To do this, converter 66 includes an input lead 67 on which are generated First LO signals by an LO synthesizer 68. Specifically, synthesizer 68 generates First LO signals of a frequency 30.051,800 MHz when modulation synthesizer 61 generates frequency f; First LO signals of frequency 29.976,852 MHz when modulation synthesizer 61 generates frequency f2; and first LO signals of frequency 28.477,880 MHz when modulation synthesizer 61 generates frequency f3.

The first IF frequency of 2.398 KHz is further down shifted within down converter 66 to a frequency of 480 Hz. This signal is termed the Modulation Carrier Phase Signal, and is generated on lead 69. A Second LO signal of frequency 1.918 KHz is received by converter 66 on a lead 70 to accomplish the frequency shift to 480 Hz.

Lead 69 couples to the input of a digital phase meter 71. Phase meter 71 also has a second input 72 for receiving 480 Hz signals representative of the phase of the transmitted light beam 13. In operation, phase meter 71 measures the phase difference between the signals on leads 69 and 72. That is, it measures the previously described mathematical terms $k_1$ and $k_2$. These terms are interrogated by a microprocessor 72 via an IO data bus 74.

IO data bus 74 also couples to inputs on modulation synthesizer 61, IR transmitter 63, and LO synthesizer 68. By signalling on this bus, processor 73 selects the modulation frequency for signals on lead 62, selectively enables or disables transmitter 63, and selects the First LO frequency for LO synthesizer 68 to generate.

Also included within the disclosed device is a clock generator 75, which produces several signals of fixed frequencies that are utilized by components 61, 66, 68 and 71 for their operation. For example, generator 75 generates the Second LO signal on lead 70 at a frequency of 1.918 KHz. Generator 75 also produces the modulation reference phase signal on lead 72 at a frequency 480 Hz. In addition, generator 75 has outputs 76–80 on which are generated signals of frequency 23.9834 MHz, 74.948125 KHz, 23.98100 MHz, 74.984125 KHz and 2.3981 MHz respectively. The reason for these particular frequencies will become apparent by reference to that portion of the description which describes the particular block that utilizes the frequencies.

The remaining blocks in FIG. 5 all operate in conjunction with microprocessor 73. These include control panel 32, display 41, and inclinometer 81. Control panel 32 and display 41 were previously described in conjunction with FIGS. 3 and 4. The function of inclinometer 81 was also briefly described in conjunction with FIG. 1; and its construction will be further described in conjunction with FIGS. 15 and 16.

Basically, however, microprocessor 73 receives manually activated commands by interrogating panel 32 via bus 74. When these commands indicate a request to measure slope distance 16a, processor 73 sends appropriate signals via bus 74 to activate components 61, 63, 68 and 71 as described above. That is, processor 73 sequentially causes light beam 13 to be transmitted with modulation frequencies f1-f3. The phase information relating to these signals is received via bus 74 from phase meter 71. For frequencies f1 and f3, approximately 80 phase measurements are made; whereas for modulation frequency f2, approximately 250 phase measurements are made. The purpose of these multiple phase measurements is to obtain a statistically reliable average value for the quantities $k_1$, $k_2$, and $k_3$. That is, for each phase measurement made by phase meter 71, there will be some slight difference; and these multiple measurements are made by processor 73 to average out these differences.

Microprocessor 73 also sends and receives signals to IR receiver 64 and down converter 66 via bus 74. Specifically, down converter 66 includes circuitry which measures the signal strength of reflected light beam 15. Microprocessor 73 receives this information via bus 74, and in response thereto adjusts the gain of IR receiver 64. This gain setting is adjusted by changing the opening of an iris type shutter within receiver 64. By utilizing this electromechanical gain control, as opposed to totally electronic gain control, the disclosed device will maintain a constant signal level on the receiving diode for signal strength variations in the ratio of 300 to 1. To control the signal level solely by electronics would require approximately three AGC stages of electronic circuitry within receiver 64. Also, adjusting the signal level before it reaches the photodiode allows the diode to operate only in a small dynamic range. This in turn eliminates phase shift errors that are caused by nonlinearities in a large dynamic range of operation.

Still another task performed by microprocessor 73 is the computation of offset phase errors which may be introduced by any of the components 61–81. This computation is performed by sending a signal via bus 74 to transmitter 63 which causes a test light beam 82 to be sent directly to receiver 64. The output from phase meter 71 that is generated in response to test light beam 82 is sensed and stored by processor 73. This is used as a correction factor in the subsequent calculation of phase angles $k_1$, $k_2$, $k_3$ and slope distance 16a.

Referring now to FIG. 7, there is illustrated a detailed circuit diagram of modulation synthesizer 61, LO synthesizer 68, and clock generator 75. Included within clock generator 75 is a master oscillator 91 which generates output signals of a frequency 23.9834 MHz on leads 92a and 92b. Lead 92a couples to the input of a counter 93 which divides by 320. Accordingly, the output of counter 93 is a signal of 74.948125 KHz. This signal is generated on lead 77. Signals on leads 92b of frequency 23.9834 MHz couple to lead 76. Leads 76 and 77 comprise the two inputs to modulation synthesizer 61 as was described in conjunction with FIG. 5.

Modulation synthesizer 61 is basically comprised of a phase locked loop. This loop includes a voltage control oscillator 94, a mixer 95, a low pass filter 96, a divide by N counter 97, a phase detector 98, and an amplifier with loop compensation 99. Components 94–99 are interconnected to form a phase locked loop as illustrated in FIG. 7. In operation, this loop functions to generate frequencies f1, f2 and f3 respectively of 30.054,198 MHz; 29.979,250 MHz; and 28.480,278 MHz. These frequencies are generated by the phase locked loop by performing operations on the frequencies received on leads 76 and 77. In particular, due to the operation of the phase locked loop, signals on lead 62 have a frequency equal to the frequency of signals on lead 78 plus N times the frequency of signals on lead 77. In this relationship, N is the amount by which counter 97 divides. The particular value of N is loaded under control of microprocessor 73 via data IO bus 74. To generate frequencies f1, f2 and f3, microprocessor 73 causes N to equal 81, 80 and 60 respectively.

LO synthesizer 68 is comprised of a phase locked loop which is identical in construction to the phase locked loop of modulation synthesizer 61. That is, the loop within synthesizer 68 contains components 94a–99a which corresponds to components 94–99 within the loop of modulation synthesizer 61. In operation, LO synthesizer 68 generates output signals on lead 67 of frequencies 30.051,800 MHz; 29.976,852 MHz and 28.477,880 MHz. These frequencies respectively differ from frequencies f1, f2 and f3 by the fixed amount of 2.398 KHz—which is the value of the first IF frequency in down converter 66.

To generate these frequencies, LO synthesizer 68 operates on signals received from leads 78 and 79. In particular, due to the operation of the phase locked loop within the synthesizer 68, the frequency of signals on lead 67 equals a frequency of signals on lead 78 plus N times the frequency of signals on lead 79. In this relationship, N is the amount by which counter 97a divides by. This N is the same value of N that counter 97 divides by. Therefore, in order for the frequencies of signals on lead 62 and 67 to differ from each other by 2.398 KHz, it is necessary for the frequencies of signals on lead 76 and 78 to also differ from each other by 2.398 KHz. Accordingly, the frequency of signals on lead 78 is fixed at 23.98100 MHz.

Clock generator 75 contains circuitry for generating signals on lead 78 at the above described frequency. This circuitry includes another phase locked loop which is comprised of a voltage controlled crystal oscillator 94b, a mixer 95b, a low pass filter 96b, a phase detector 98b, and an amplifier with loop compensation 99b. The loop also includes a divide by 10 counter 100, a divide by 125 counter 101, and a divide by 8 counter 102. These components are all interconnected as illustrated in FIG. 7. Based on these interconnections and the phase locking operation of the loop, it can be shown that the frequencies of signals on lead 78 is related to the frequencies on lead 76 by the quantity $$\frac{10 \times 125 \times 8}{1 + 10 \times 125 \times 8}.$$

Also, the frequency on lead 76 was previously described as being equal to 23.983400 MHz. Thus based on these two relationships, it follows that the frequency difference of signals on lead 76 and 78 equals the desired amount of 2.398 KHz.

Figure 8:
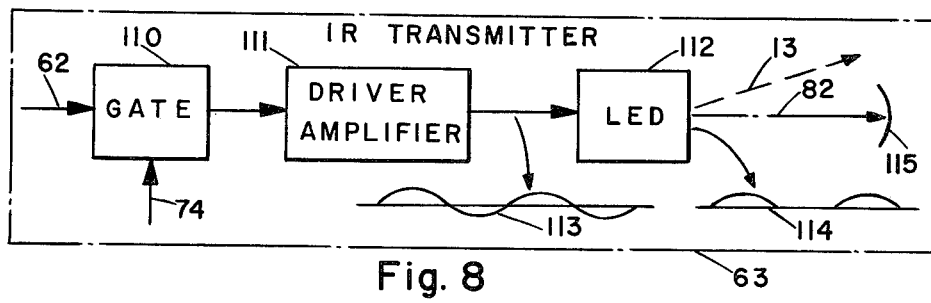
FIG. 8 is a detailed circuit diagram of block 63 in FIG. 5.

Details of the physical implementation of IR transmitter 63, IR receiver 64, and down converter 66 will now be described in conjunction with FIGS. 8, 9 and 10 respectively. As illustrated in FIG. 8, IR transmitter 63 includes an analog gate circuit 110, a driver amplifier 111, and an infrared light emitting diode 112. Components 110–112 are serially interconnected as illustrated.

Lead 62, carrying the modulation frequencies f1, f2 and f3, connects to the input of analog gate 110. Also, microprocessor IO data processor 74 couples to a control input gate 110 to thereby provide a means for logically enabling and disabling the passage of signals on lead 62 through gate 110. Further, amplifier 111 provides a suitable gain for the signals which are passed by the gate 110. These signals are sinusoidal at the modulating frequency f1–f3 as illustrated, in general, by the waveform 113.

Light emitting diode 112 preferably is biased to only pass the positive portion of waveform 113. As a result, the amplitude modulated light beam which is transmitted has the general shape of the waveform as illustrated at 114. That is, transmitted light beam 13 consists of spaced apart bursts of infrared light, which have an envelope that is shaped as waveform 114.

Also illustrated in FIG. 8, in schematic fashion, is an opaque disc 115. In operation, disc 115 is positioned to either block light beam 13, or block test light beam 82. The positioning of disc 115 is performed under control of signals on bus 74 from microprocessor 73. Further details on the physical implementation of this portion of the IR transmitter are described in conjunction with FIG. 13.

Figure 9:
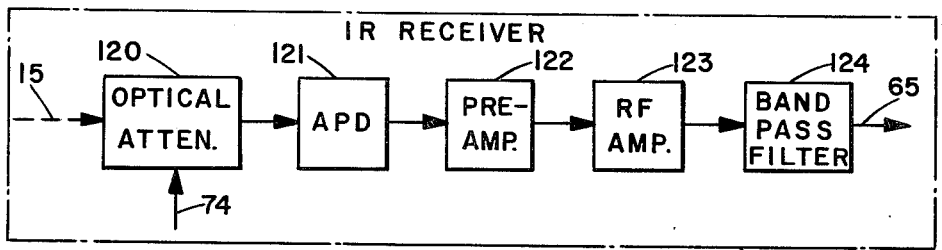
FIG. 9 is a detailed circuit diagram of block 64 in FIG. 5.

A detailed circuit diagram of IR receiver 64 is illustrated in FIG. 9. Included therein is an optical attenuator 120, an avalanche photo diode 121, a pair of amplifiers 122 and 123, and a bandpass filter 124. Components 120-124 are serially interconnected as illustrated. The input to optical attenuator 120 is the reflected light beam 15. Attenuator 120 provides the only variable gain within receiver 64 and down converter 66. The variable gain of attenuator 120 is implemented physically by a mechanical shutter, which acts like an iris to control the amount of light that passes through the shutter. By this means, gain variation of approximately 100 dB electrical is achieved. The actual size of the iris opening is controlled by logic signals which are sent by microprocessor 73 on IO bus 74. Further details on attenuator 120 are described in conjunction with FIG. 14.

Figure 10:
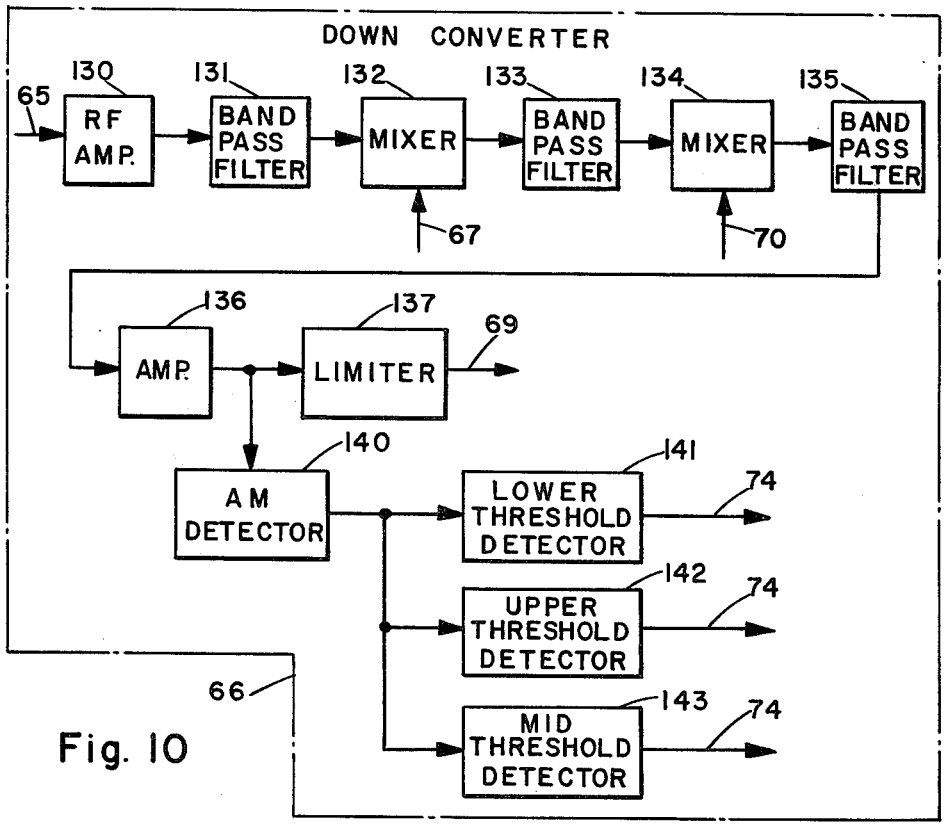
FIG. 10 is a detailed circuit diagram of block 66 in FIG. 5.

The output of IR receiver 64 couples via lead 65 to the input of down converter 66, as illustrated in FIG. 10. Included therein is an RF amplifier 130, a bandpass filter 131, a mixer 132, a bandpass filter 133, a mixer 134, a bandpass filter 135, an amplifier 136, and a limiter 137. Components 130-137 are serially interconnected as illustrated. Lead 67, which carries the previously described LO frequency signals, connects to one of the inputs of mixer 132. Accordingly, signals at the output of mixer 132 are at the first IF frequency of 2.398 KHz. Lead 70, carrying the previously described second LO frequency signals, connects to an input of mixer 134. These second LO signals are at a frequency of 1.98 KHz; and accordingly signals at the output of mixer 134 are at the fixed frequency of 480 Hz. These 480 Hz signals are converted to a square wave by amplifier 136 and limiter 137. The resulting signals are generated on lead 69, as the previously described modulation carrier signals.

Down converter 66 also includes an amplitude modulator detector 140, a low threshhold detector 141, an upper threshhold detector 142, and a mid-threshhold detector 143. These may suitably be constructed of three comparators having respective low, high, and mid fixed references. Components 140-143 are interconnected as illustrated in FIG. 10. In operation, detectors 141-143 generate output signals which indicate the magnitude of the reflected light beam 15. These signals are sensed by microprocessor 73 via IO data processor 74. In response thereto, processor 73 sends logical signals to optical attenuator 120 which adjusts its gain such that signals at the output of attenuator 120 are of a predetermined magnitude.

The details of digital phase meter 71 will now be described in conjunction with FIGS. 11 and 12. As illustrated in FIG. 11, phase meter 71 includes four serially connected divide by 10 counters 150-153. These counters are cleared by a logical signal on a lead 154, and are triggered to count at the frequency of the signals on a lead 155. The counting signals on lead 155 are generated by the high frequency clock signals on lead 80. Accordingly, counters 150-153 count at a rate of 2.4 MHz. A logic circuit 156 selectively passes the 2.4 MHz signals on lead 80 to lead 155 in response to Start and Stop signals on leads 157.

The Start and Stop signals, along with the Clear signal, are generated by digital control logic circuit 158. Circuit 158 has inputs for simultaneously receiving the carrier phase input signal on lead 69 and the reference phase input signal on lead 72. Circuit 158 also has inputs for receiving commands from microprocessor 73 via IO data bus 74. These commands specify one of two modes of operation for the control logic 158. In particular, control logic 158 operates in a lead—lead mode, and a lead—lag mode. The purpose for these two modes of operation is indicated by wave forms of FIG. 12. These wave forms includes a signal S72 which represents the 480 Hz reference phase signals on lead 72. Also included are signals S69a and S69b which represent two examples of the carrier phase signal on lead 69. As illustrated, signals S69a and S69b are asymmetrical. That is, their duty cycle is not 50%. Signal S69a has a less than 50% duty cycle; while S69b has a greater than 50% duty cycle. Ideally, signals on lead 69, which are representative of the reflected light beam, would have a 50% duty cycle. In actuality however, these signals do not have a 50% duty cycle because they are shrinked and stretched by unpredictable amounts due to the signal processing which is performed by receiver 64 and down converter 66.

The disclosed device performs a lead—lead and lead—lag phase measurement on the actual signals S69a and S69b with respect to signals S72 in order to determine the phase relationship between the ideal waveform and signals S72. In FIG. 12, the letter A represents the lead—lead phase measurement which phase meter 71 performs; the letter B represent the lead—lag phase measurement which phase meter 71 performs; and the symbol $\phi$ represents the phase difference of the ideal waveform which is to be calculated. Based on the values of A and B, microprocessor 73 calculates $\phi$ by the equation:

$$\phi = \frac{A+B}{2} - \frac{\pi}{2}$$

In this equation the first term represents the phase of the center of the actual received signal, and the second term represents a 90° phase shift from the center to the edge of an ideal received signal. Accordingly, the disclosed device compensates for any errors in phase measurement which is due to lack of symmetry in the signals on lead 69.

The degree to which distance is resolved is dependent upon the wavelength of the modulating frequencies f1-f3, the frequency of the reference phase signals on lead 72, and the frequency of the high frequency clock signals on lead 80. In particular, since signals on lead 72 are 480 Hz and signals on lead 80 are 2.4 MHz, counters 150-153 will count up to a total of 5,000 counts for one cycle of the signals on lead 72. And one cycle of a signal on lead 72 represents one wavelength of the modulating frequency.

Thus, for example, when the modulating frequency is f2, the corresponding wavelength is ten meters; and the resolution of distance 16a is ten meters divided by two divided by 5,000 counts which is 0.001 meters per count. Similarly, when a modulating frequency of f1 is transmitted followed by a modulating frequency of f2, the corresponding difference frequency is 75 KHz as was previously described. A 75 KHz signal has a wavelength of 4,000 meters. And thus the corresponding resolution of this distance 16a is 4,000 meters divided by two divided by 5,000 counts, which is 0.4 meters per count. Similarly, the previously described difference frequency of 1.5 MHz has a wavelength of 200 meters. And the resolution of distance 16a is 200 meters divided by two divided by 5,000 counts which is 0.02 meters per count.

The above resolutions of 0.001 meters per count, 0.02 meters per count, and 0.4 meters per count differ from each other by a factor of 20. This spacing conveniently allows microprocessor 73 to utilize a 75 KHz difference frequency to determine the thousands and hundred digits of the unknown distance, to utilize the difference frequency of 1.5 MHz to determine the tens and units digits of the unknown distance, and to utilize the frequency of 2.979 MHz to determine the tenths, hundredths, and thousandths digits of the unknown distance.

Figure 13:
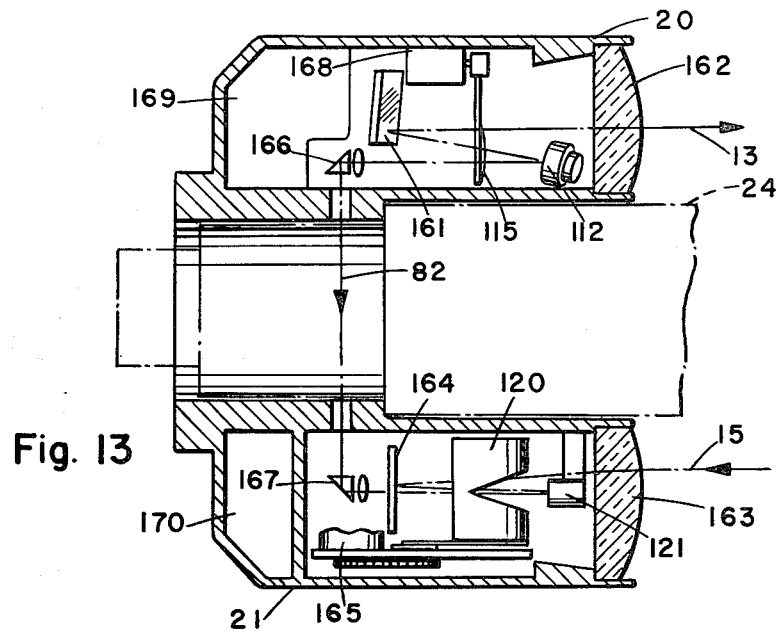
FIG. 13 is a detailed cross sectional view of the optics included within the disclosed device.

A detailed cross sectional view of the theodolite mounted portion of the disclosed device is illustrated in FIG. 13. Reference numerals 20, 21 and 22 respectively indicate the transmit aiming head, the receive aiming head, and the theodolite mount. Basically, a total of three optical paths exist within these components. The optical path for the transmitted light beam 13 begins with light emitting diode 112, and proceeds to a reflective mirror 161, and then through a lens 162. Similarly, the optical path for the received light beam 15 begins with a lens 163, and proceeds through the iris type shutter 120 to a reflective mirror 164 and then to an avalanche photo diode 121. A motor drive assembly 165 mechanically couples to shutter 120 to control the size of the opening through the iris contained therein. This shutter is illustrated in detail in FIG. 14.

The optical path for the calibrate light beam 82 begins with light emitting diode 112 and proceeds through a columinating lens to a prism 166. There the optical path takes a right angle to a pair of right angle prisms 167. From prisms 167, the optical path extends through a hole in mirror 164 to the avalance photo diode 121. A second motor drive assembly 168 mechanically connects to the opaque disc 115. In operation, motor assembly 168 alternately positions disc 115 to either block the optical path of light beam 13 or light beam 82, to thereby select the proper mode of operation.

By utilizing mirrors 161 and 164, the optical path for light beams 13 and 15 are folded. As a result, the focal length for each lens 162 and 163 is about twice the distance between the lens and its corresponding reflecting mirror. This allows the length of transmit aiming head 20 and receive aiming head 21 to be relatively short, while at the same time, provides spaces 169 and 170 for packaging some of the previously described electronic circuitry. For example, space 169 provides room for packaging LED drive amplifier 111 and a portion of inclinometer 81; whereas space 170 provides room for packaging amplifiers 122 and 123. In addition, the overall length of transmit aiming head 20 and receiving aiming head 21 is kept short enough to allow the entire subassembly to be plungeable white mounted on the theodolite telescope.

Figure 14:
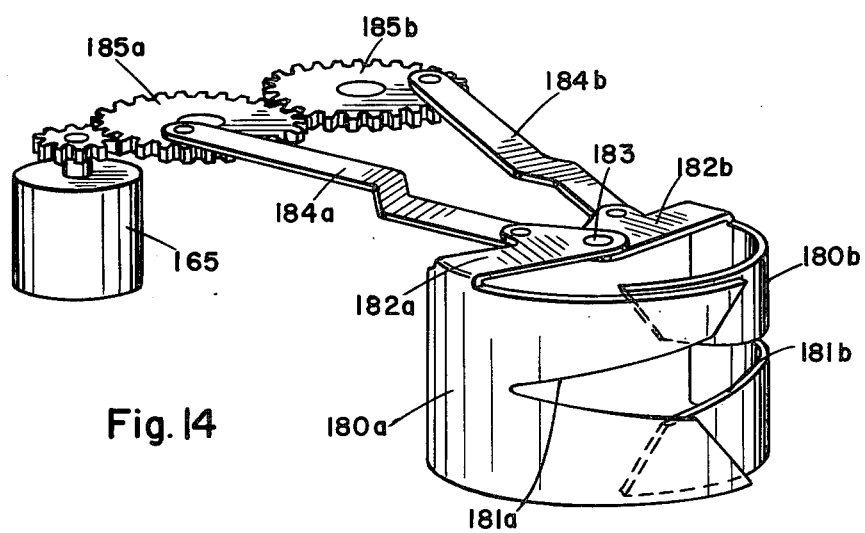
FIG. 14 is a detailed view of an iris type mechanical shutter within the optics of FIG. 13.

Further details of the iris shutter assembly 120 are illustrated in FIG. 14. As therein illustrated, shutter 120 includes a pair of opaque members 180a and 180b, having slots 181a and 181b respectively. These members are positioned within aiming head 21 such that slots 180a and 180b align with each other, and form an opening that is centered with the optical path for light beam 15. Members 180a and 180b also have respective pivot arms 182a and 182b. These pivot arms connect together at a common axis 183 as illustrated. A pair of connecting rods 184a and 184b connect the pivot arms to gears 185a and 185b. Gear 185a is driven by motor 165, which moves members 180a and 180b to thereby adjust the size of the opening formed by slots 181a and 181b. In this manner, the area of the opening, and the corresponding "gain" of the receiver optics, can be adjusted by approximately 80 db.

Figure 15:
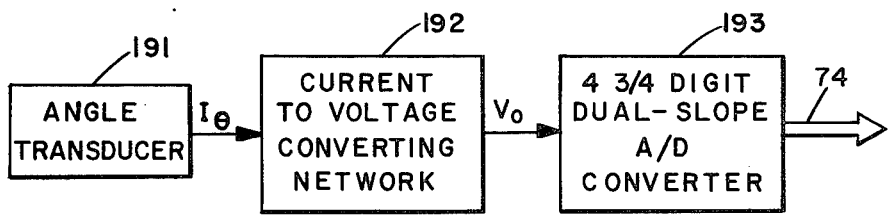
FIG. 15 is a detailed circuit diagram of block 81 within FIG. 5.

Referring now to FIG. 15, the details of inclinometer 81 will be described. Inclinometer 81 consists of an angle transducer 191, a current to voltage converting network 192, and a dual slope analog-to-digital 193. Components 191-193 are serially interconnected as illustrated in FIG. 15. In the preferred embodiment, angle transducer 191 is an accelerometer. In general, the output of an accelerometer indicates acceleration. However, the disclosed device combines the accelerometer with other circuitry as illustrated to measure the angle of the accelerometer with respect to the horizontal axis. Suitably, a Sundstrand Q-Flex accelerometer may be utilized. This particular accelerometer has an output current I which can be expressed as:

$$I = K_0 + K_1 \sin(\phi + \theta_1) \text{ where } \phi + \theta_1 = \theta$$

As used in this device, the terms $K_0$ and $K_1$ vary with temperature, local gravity, and unit-to-unit component tolerances. The term $\theta_1$ represents an offset angle of the accelerometer with respect to the horizon. This angle typically is anywhere between +1 and −1 degrees.

In the disclosed system, the terms $K_0$, $K_1$, and $\theta_1$ are determined by an in field calibration procedure. This calibration is performed by setting the theodolite telescope at three known angles and by setting appropriate switches on the control panel as was previously described. In response thereto, microprocessor 73 senses the digital voltage which is generated by inclinometer 81 via output bus 74. These voltages are then utilized to calculate the constants, which are then stored in the microprocessor memory. By this in field calibration process, errors which could be introduced in the inclinometer due to such things as temperature variations, local gravity variations, and unit to unit component tolerances are eliminated.

In addition, the resolution of the disclosed inclinometer is extremely accurate. This is due, in part, to the fact that the resolution of current I from the accelerometer is equivalent to the order of micro g's; and its linearity is on the order of tens of micro g's. But in addition, this resolution is preserved by a four and three quarters digit dual slope A to D converter 193. That is, the full scale of converter 193 is forty thousand counts, which sufficiently preserves the resolution of current I while converting it from analog form to digital form. The digital output of converter 193 is connected to IO bus 74, where it is sensed and operated by microprocessor 73 to compute horizontal distance 16c and vertical distance 16d as was described earlier.

Various embodiments of the invention have now been described in detail. In addition, many changes and modifications can be made to these details without departing from the nature and spirit of the invention. Therefore it is to be understood that the invention is not limited to said details, but is defined by the appended claims.

What we claim is:

1. A device for electro-optically measuring distances between said device and remote target, said device comprising;

first electronic means for generating electrical modulation signals of first, second, and third selectable frequencies, and for generating a light beam which is amplitude modulated by said modulation signals, optical means for transmitting said amplitude modulated light beam to said target, and for receiving reflections of said light beam therefrom, second electronic means for converting said reflections to electrical signals representative of said reflections, coupled to said optical means, third electronic means for computing the phase angles $\theta 1$, $\theta 2$, and $\theta 3$ respectively between said modulation signals of said first, second, and third selectable frequencies and said signal representative of said reflections, coupled to said first and second electronic means, and fourth electronic means coupled to said third electronic means for computing the most significant digits of the distance L based on the relationships $L = \lambda D12 \, (\theta 1 - \theta 2)$ when $(\theta 1 - \theta 2)$ is positive and $L = D12 \, (1 + \theta 1 - \theta 2)$ is negative, and for computing the remaining digits of the distance L based on the relationships $L = \lambda D23 \, (\theta 2 - \theta 3)$ when $(\theta 2 - \theta 3)$ is positive, $L = D23 \, (1 + \theta 2 - \theta 3)$ when $(\theta 2 - \theta 3)$ is negative, and $L = \lambda 2(\theta 2)$ where $\lambda D12$ and $\lambda D23$ are the wavelengths of hypothetical light beams which are amplitude modulated at the difference between said first and second selectable frequencies, and said second and third selectable frequencies respectively.

2. A device according to claim 1, wherein said first, second and third selectable frequencies are substantially greater than the difference between said first and second selectable frequencies, and further are substantially greater than the difference between said second and third selectable frequencies.

3. A device according to claim 2, wherein the said first, second and third selectable frequencies are chosen such that $\lambda_{D12}$ is greater than L, $\lambda_{D23}$ is approximately 1/20th $\lambda_{D12}$, and $\lambda_2$ is approximately 1/20th $\lambda_{D23}$.

4. A device according to claim 1, wherein said third electronic means further includes means for computing both lead—lead phase angles and lead—lag phase angles between said modulation signals and said signals representative of said reflections.

5. A device according to claim 4, wherein said fourth electronic means further includes means for computing distortion compensated phase angles $\phi$ based on the expression $\phi = (A+B)/2 - (\pi/2)$ where A is said lead—lead phase angle and B is said lead—lag phase angle.

6. A device according to claim 1, and further including a fifth electronic means comprised of an accelerometer having an analog output current I representative of the angle of said accelerometer with the horizon, and of an analog-to-digital converter having an input coupled to said accelerometer and an output coupled to said fourth electrical means for converting said current I to a digital number representative thereof.

7. A device according to claim 6, wherein said analog-to-digital converter is a multi-digit dual slope converter.

8. A device according to claim 6, wherein said analog output current I is representative of said angle throughout the range of 0 to 90 degrees.

9. A device according to claim 6, wherein said analog output current I includes offset error terms, and wherein said fourth electronic means includes means for receiving signals indicating said accelerometer is at predetermined angular positions, means for sensing said digital numbers from said analog-to-digital converter, and means for calibrating out said offset errors in response thereto.

10. A device according to claim 6, wherein said fourth electronic means is comprised of a microprocessor means for selecting said modulating frequencies, computing said distance L, and calculating horizontal distance and vertical distance to said target.

11. A device according to claim 1, wherein said optical means is shaped to be rigidly attachable to a theodolite telescope such that said telescope is plungeable with said optical means attached thereto.

12. A device according to claim 11, wherein said optical means includes a transmit aiming head having folded optics comprised of a lens for focusing said light beam onto said target, a light source positioned near said lens to generate said modulated light beam, and a mirror spaced apart from said lens at approximately one half the focal length thereof to reflect said light beam from said light source to said lens.

13. A device according to claim 11, wherein said optical means includes a receive aiming head having folded optics comprised of a lens for receiving and focusing said reflections from said target, a light sensor means positioned adjacent said lens for converting said focused reflections to electrical signals representative thereof, and a mirror spaced apart from said lens at approximately one half the focal length thereof to reflect said focused reflections onto said light sensor means.

14. A device according to claim 1, wherein said optical means includes an iris shaped shutter having an opening through which said reflection passes, wherein the area of said opening adjusts in response to digital control signals.

* * * * *